(12) United States Patent
Wolf

(10) Patent No.: US 9,122,269 B2
(45) Date of Patent: Sep. 1, 2015

(54) METHOD AND SYSTEM FOR OPERATING A MACHINE FROM THE FIELD OF AUTOMATION ENGINEERING

(75) Inventor: Edgar Wolf, Herrenberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 498 days.

(21) Appl. No.: 13/292,551

(22) Filed: Nov. 9, 2011

(65) Prior Publication Data
US 2012/0290108 A1 Nov. 15, 2012

(30) Foreign Application Priority Data

Nov. 10, 2010 (EP) .................................... 10190689

(51) Int. Cl.
*G05B 19/4069* (2006.01)
*G05B 17/02* (2006.01)
*G05B 19/418* (2006.01)

(52) U.S. Cl.
CPC ............ *G05B 19/4069* (2013.01); *G05B 17/02* (2013.01); *G05B 19/4185* (2013.01); *G05B 19/41885* (2013.01); *G05B 2219/32038* (2013.01); *G05B 2219/35311* (2013.01); *G05B 2219/40167* (2013.01)

(58) Field of Classification Search
CPC ...................... G05B 19/4069; G05B 19/41885; G05B 19/4185; G05B 17/02; G05B 2219/40167; G05B 2219/35311; G05B 2219/32038; G05B 2219/36133
USPC ......... 700/17, 83, 197, 200; 703/14; 709/203; 717/109
See application file for complete search history.

(56) References Cited

U.S. PATENT DOCUMENTS

| | | | | |
|---|---|---|---|---|
| 6,282,699 | B1 * | 8/2001 | Zhang et al. | 717/109 |
| 7,159,183 | B1 * | 1/2007 | Kudukoli et al. | 715/762 |
| 7,539,547 | B2 * | 5/2009 | Stange et al. | 700/17 |
| 7,640,291 | B2 * | 12/2009 | Maturana et al. | 709/202 |
| 7,853,645 | B2 * | 12/2010 | Brown et al. | 709/203 |
| 2003/0033130 | A1 * | 2/2003 | Hara et al. | 703/14 |
| 2007/0186144 | A1 | 8/2007 | Stange et al. | |
| 2009/0299509 | A1 | 12/2009 | Diezel et al. | |

FOREIGN PATENT DOCUMENTS

| | | |
|---|---|---|
| CN | 101044440 A | 9/2007 |
| CN | 101278243 A | 10/2008 |
| DE | 10140969 A1 | 3/2003 |
| DE | 102005047543 A1 | 1/2007 |
| WO | WO 2008113305 A1 | 9/2008 |

* cited by examiner

Primary Examiner — Robert Fennema
Assistant Examiner — Fenyang Stewart
(74) Attorney, Agent, or Firm — Henry M. Feiereisen LLC.

(57) ABSTRACT

In a method and system for operating a machine from the field of automation engineering, operating inputs entered at an operating unit of the machine and an identification code are transmitted via a data network to communication server software running on an external computing device. The communication server software determines MMI (machine-machine-interface) application software associated with the machine and with the operating inputs and transfers the operating inputs to the MMI application software, which in turn determines visualization data on the basis of the operating inputs. The visualization data specify a graphical output image to be represented on a display screen and are transferred to the machine via the communication server software and the data network for display. The performance characteristics of the machine can thereby be enhanced, without increasing demands on the hardware.

7 Claims, 1 Drawing Sheet

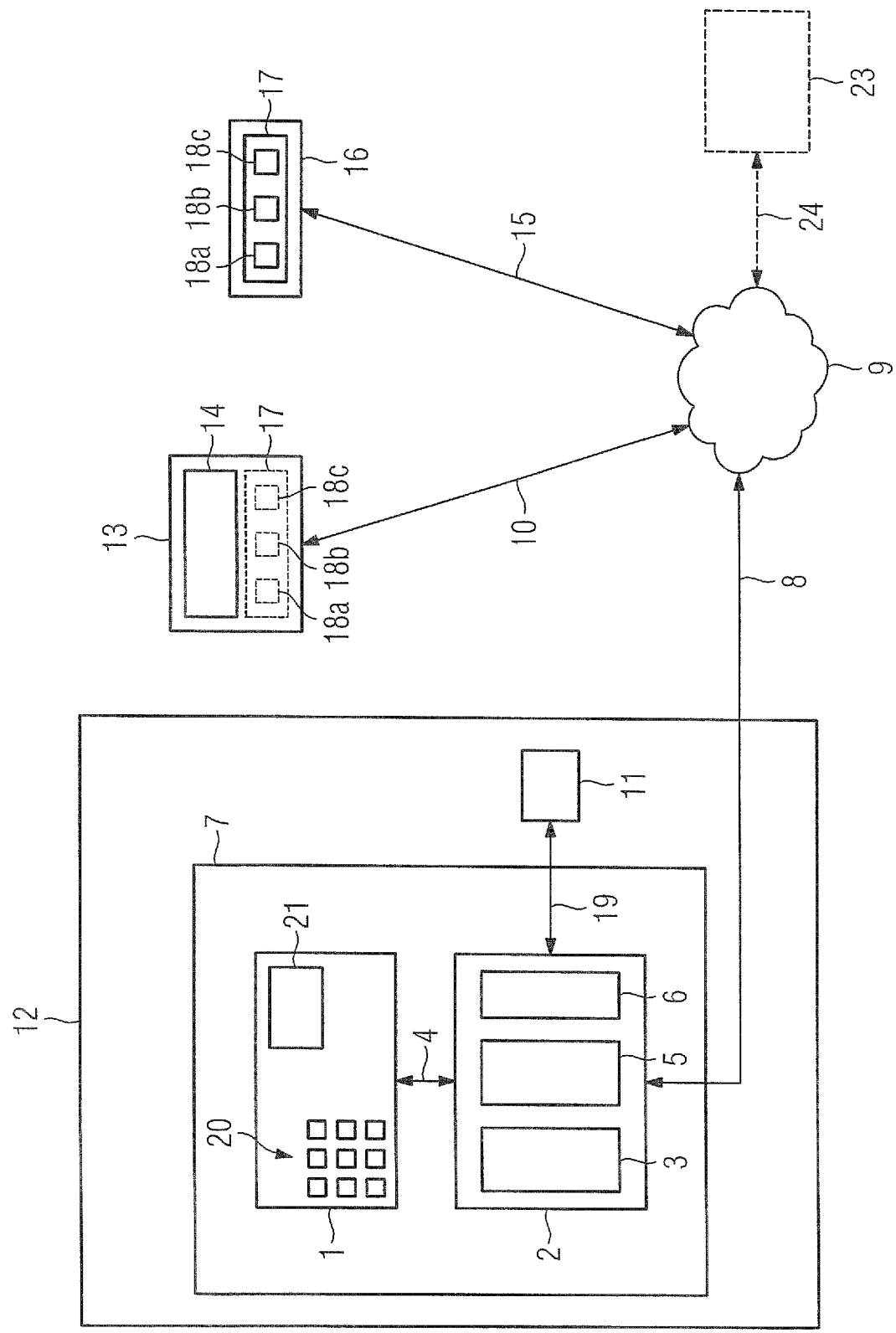

METHOD AND SYSTEM FOR OPERATING A MACHINE FROM THE FIELD OF AUTOMATION ENGINEERING

CROSS-REFERENCES TO RELATED APPLICATIONS

This application claims the priority of European Patent Application, Serial No. EP10190689, filed Nov. 10, 2010, pursuant to 35 U.S.C. 119(a)-(d), the content of which is incorporated herein by reference in its entirety as if fully set forth herein.

BACKGROUND OF THE INVENTION

The present invention relates to a method for operating a machine from the field of automation engineering. The invention further relates to a corresponding system for operating a machine from the field of automation engineering, to a control device for a machine from the field of automation engineering, and to a device for operating a machine from the field of automation engineering.

The following discussion of related art is provided to assist the reader in understanding the advantages of the invention, and is not to be construed as an admission that this related art is prior art to this invention.

In the context of machines from the field of automation engineering, such as e.g. machine tools, production machines and/or robots, it is customary for the MMI software (Machine-Machine Interface) which allows the machine to be operated to run on the same hardware, i.e. on the same processor or processors, as the control software for the machine. In this case, the MMI software is also referred to as HMI software (Human-Machine Interface) in a technical context. This means that any upgrade that is required in respect of the MMI software generally requires a shutdown of the machine. Therefore, if new MMI software is to be installed on the control device of the machine, the new MMI software has to be installed on the control device by an operator of the machine, in particular by an installation technician. For this, it is usually necessary to shut down the machine for the duration of the upgrade process as mentioned previously. During the upgrade process, it is not generally possible to operate the machine via the MMI software. If the machine is part of a production chain, an upgrade of the MMI software can therefore signify a complete production stoppage. If the upgrade is not successful, additional machine downtime will be required in order to de-install the MMI software upgrade.

If the new MMI software also requires more resources (e.g. more storage space, more computing time, etc.) than the MMI software that was previously used, further time will have to be spent on the installation of more powerful hardware. The disadvantages cited above often discourage the more efficient machine operation offered by new MMI software, because the resulting advantages do not outweigh the disadvantages that would be incurred due to the production stoppage.

When the MMI software is in use, the operating efficiency of the machine is heavily dependent on the performance characteristics of the control device of the machine. However, machines from the field of automation engineering are acquired successively over a long period, and therefore they have different performance characteristics due to the development progress of the control hardware. However, the machine operator often prefers the same MMI software to run on all of the control devices of the machines concerned, in order to allow uniformity of operation. This is often not possible in the case of older machines due to the less powerful hardware of the control devices, however, and therefore an upgrade of the hardware becomes necessary in the case of older machines.

It should be noted at this point that the term "operate" is also understood to mean "monitor" and "manage" in the context of the present application.

It would therefore be desirable and advantageous to obviate prior art shortcomings and to provide an improved method for improving the performance characteristics relative to the operation of a machine from the field of automation engineering, without increasing the demands on the hardware of the machine.

SUMMARY OF THE INVENTION

According to one aspect of the invention, the present invention resolves prior art problems with a method for operating a machine from the field of automation engineering with the steps of transmitting operating inputs entered at an operating unit of the machine having a screen and an identification code via a data network to communication server software running on an external computing device, determining based on the identification code with the communication server software MMI application software associated with the machine and with the operating inputs, transferring with the communication server software the operating inputs to the determined MMI application software running on the external computing device or on an additional external computing device, determining with the MMI application software visualization data on the basis of the operating inputs, with the visualization data specifying a graphical output image to be represented on the screen, transferring the visualization data to the machine via the communication server software and the data network, and representing the graphical output image on the screen based on the visualization data.

According to another aspect of the invention, a system for operating a machine from the field of automation engineering includes an operating unit having a display screen, an external computing device running communication server software, and a control device associated with the machine and configured to transfer operating inputs entered at the operating unit and an identification code via a data network to the communication server software running on the external computing device. The communication server software is configured to determine, based on the identification code, MMI application software associated with the machine and with the operating inputs, and to transfer the operating inputs to the associated determined MMI application software running on the external computing device or on an additional external computing device. The associated MMI application software is configured to determine visualization data based on the operating inputs, with the visualization data specifying a graphical output image to be represented on the display screen. The system is configured to transfer the visualization data via the communication server software and the data network to the control device, which is configured to represent the graphical output image on the display screen based on the visualization data.

According to yet another aspect of the invention, a control device for a machine from the field of automation engineering includes an operating unit having a display screen, an input device and a computing unit, wherein the computing unit is configured to generate control variables for controlling drives of the machine and to transfer operating inputs entered at the operating unit and an identification code to a data network. The computing unit is further configured to receive from the data network visualization data determined by MMI application software based on the operating inputs, wherein the visualization data specifies a graphical output image to be represented on the display screen. The computing unit is further configured to determine the graphical output image based on the visualization data, and the control device is configured to represent the graphical output image on the display screen based on the visualization data.

According to still another aspect of the invention, a device for operating a machine from the field of automation engineering includes communication server software and MMI application software running on the device, wherein the communication server software is configured to receive via a data network operating inputs entered at an operating unit of the machine and an identification code. The communication server software is further configured to determine, based on the identification code, MMI application software associated with the machine and with the operating inputs and to transfer the operating inputs to the determined MMI application software running on the external computing device or on an additional external computing device. The MMI application software is configured to determine visualization data based on the operating inputs, with the visualization data specifying a graphical output image to be represented on the display screen. The device is configured to transfer the visualization data via the communication server software and the data network to the machine.

Advantageous embodiments of the invention may include one or more of the following features.

According to one advantageous feature of the present invention, the operating inputs and the identification code may be transferred by using client software running on the machine via a data network to the communication server software running on an external computing device or on a further external computing device. As a result of using client software, the machine from the field of automation engineering can be linked to the data network in a particularly simple manner.

According to another advantageous feature of the present invention, the visualization data may be transferred to the machine via the communication server software and the data network, wherein client software running on the machine determines the graphical output image on the basis of the visualization data, and wherein the graphical output image is represented on the screen. The output image can then be particularly easily determined.

According to another advantageous feature of the present invention, the MMI application software may be used for simulating production sequences of the machine, or the MMI application software may be used for changing part programs, or the MMI application software may be used for diagnosing the machine, or the MMI application software may be used for monitoring the machine. The developments of the MMI application software described above represent conventional embodiments of MMI application software.

The machine from the field of automation engineering may be implemented in form of a machine tool, a production machine and/or a robot.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a schematic block diagram of a method and a system for operating a machine from the field of automation engineering according to the present invention.

DETAILED DESCRIPTION OF PREFERRED EMBODIMENTS

The same or corresponding elements may generally be indicated by same reference numerals. These depicted embodiments are to be understood as illustrative of the invention and not as limiting in any way. It should also be understood that the FIGURE is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to FIG. 1, there is shown a method and a system according to the invention for operating a machine 12 from the field of automation engineering. In the context of the exemplary embodiment, the machine 12 is designed as a machine tool. The machine 12 has a control device 7, which takes the form of a CNC controller (Computer Numerical Control) in the context of the exemplary embodiment. The control device 7 has an operating unit 1, by means of which the machine 12 can be operated by an operator locally at the machine. For the purpose of operating the machine, the operating unit 1 has input means 20, which take the form of the buttons shown in the context of the exemplary embodiment, and a screen 21. The control device 7 also has a computing unit 2, which is connected via a connection 4 to the operating unit 1 for the purpose of transferring data. The computing unit 2 has one or more processors, which are used to run client software 3, MMI core software 5 and control software 6. The processors can be arranged on a single electrical assembly or on a plurality of electrical assemblies in this case. It should be noted at this point that software other than that which is specified in FIG. 1 can obviously also run on the computing unit 2, wherein for the sake of clarity only that software which is essential to the understanding of the invention is illustrated in FIG. 1.

In this case, the control software 6 is used for determining e.g. control variables such as e.g. reference variables for controlling drives 11 of the machine, these being used to move machine elements of the machine 12, such as e.g. a tool spindle and/or a machine table. The control device 7 and in particular the computing unit 2 is connected to the drives 11 via a connection 19 for the purpose of controlling the drives 11.

Unlike conventional control devices, instead of comprehensive MMI software (Man-Machine Interface) which allows sophisticated and efficient operation of the machine 12, only MMI core software 5 runs on the computing unit 2, preferably allowing only rudimentary operation (i.e. basic operation) of the machine. In the context of the exemplary embodiment, the MMI core software can therefore be used to move the machine axles of the machine 12 and, for manufacturing, to start e.g. a part program for manufacturing a workpiece. For example, the MMI core software can consist of the initial version of the MMI software, which was installed on the computing unit 2 when the machine 12 was first commissioned.

The fundamental idea of the invention consists in providing e.g. desired extended and/or improved operating functionalities in the form of MMI application software, wherein this runs on an external computing device, such that the operating functionalities of the machine 12 can be extended as desired without e.g. increasing the demand for computing time and/or storage space that is required by the computing unit 2 to perform the operating functionalities of the machine.

The control device 7 (in particular the computing unit 2), an external computing device 13 and a further external computing device 16 are connected to a data network 9 for the purpose of transferring data, this being represented by double-headed arrows 8, 10 and 15. The data network 9 can exist in the form of e.g. a LAN (Local Area Network) such as e.g. a factory network, and/or a WAN (Wide Area Network) such as e.g. the Internet. In the context of the present invention, an external computing device is understood in this case to be a computing device which is not part of the machine 12 and is preferably so arranged as to be geographically remote from the machine 12.

The client software 3 provides an interface via which data can be transferred from the operating unit 1 and the computing unit 2 to the data network 9 and from there onwards to the external computing device 13. The client software 3 can therefore e.g. transfer operating inputs, which were entered by an operator of the machine 12 using the input means 20 and the operating unit 1, and an identification code to the data network 9 and thence to communication server software 14 running on the external computing device 13. Furthermore, the client software 3 can transfer data coming via the data network 9 from the external computing device 13 to the computing unit 2 and the operating unit 1.

In the context of the exemplary embodiment, the inventive system has the further external computing device 16, on which application server software 17, the MMI application software 18a, the MMI application software 18b and the MMI application software 18c run. In this case, the application server software 17 controls the execution of the MMI application software 18a, 18b and 18c. The MMI application software 18a can be e.g. simulation software for simulating production sequences of the machine, the MMI application software 18b can be e.g. software for diagnosing the machine, and the MMI application software 18c can be e.g. software for changing part programs. Naturally, many more than the three illustrated MMI application software examples can run on the external computing device 16. The MMI application software is used to extend and improve and/or increase the efficiency of the MMI core software 5. Depending on the number of different MMI application software types, more or less extensive and convenient operation of the machine becomes possible.

If there is a plurality of machines from the field of automation engineering in this case, an MMI application software type (e.g. simulation software for simulating production sequences) can be present more than once on the further external computing device 16 and be effectively executed in parallel by the external computing device. The relevant MMI application software is then assigned to a specific machine in each case. The further machines that might be present in addition to the machine 12 are indicated by dashed lines in FIG. 1 and denoted by the reference number 23.

Operating inputs that have been submitted by an operator of the machine 12 using the input means 20, an identification code and possibly further data are transferred from the computing unit 2 via the data network 9 to the communication server software 14 running on the external computing device 13. On the basis of the identification code, the communication server software 14 determines the MMI application software which is associated with the computing unit 2, and hence with the machine 12 and the operating inputs, and for which the operating inputs and the data are intended. In the context of the exemplary embodiment, this is determined by the communication server software 14 with reference to a table, in which the designation of the MMI application software that is associated with the respective identification code is stored for existing identification codes. An identification code can consist of e.g. the internationally unique allocated serial number of the control device 7 and a code which specifies the MMI application software for which the operating inputs and data are intended.

The communication server software 14 transfers the operating inputs and data via the data network 9 to that MMI application software which is running on the further external computing device 16 and is associated with the machine 12 and has been determined by the communication server software 14. On the basis of the operating inputs, the MMI application software determines visualization data which specifies a graphical output image that is to be represented on the screen 21. The visualization data does not therefore consist solely of e.g. numerical values that are to be represented on the screen 21, but also contains information relating to how the graphical output image is to appear on the screen 21 for the operator. The visualization data therefore describes the graphical output image that is to be represented on the screen 21. If the MMI application software is software for simulating production sequences of the machine, for example, the MMI application software determines not only data that specifies e.g. the current position that must be represented for a machine table of the machine 12, but also data that specifies how the graphical image displayed on the screen 21 should appear, i.e. data describing how the machine table is represented on the screen 21, i.e. its shape and appearance.

It should be noted at this point that if the input means of the operating unit 1 comprise e.g. a computer mouse, the visualization data preferably also includes the data for correctly displaying on the screen 21 the mouse pointer that can be moved using the computer mouse. Corresponding provision applies likewise to other input devices.

Finally, the visualization data is transferred from the MMI application software via the communication server software 14 and the data network 9 to the machine 12, wherein the client software 3 determines the graphical output image on the basis of the visualization data and outputs it to the screen 21 of the operating unit 1, such that the graphical output image is represented on the screen 21.

The external computing device and/or the further external computing device can be installed on the premises of the manufacturer of the machine from the field of automation engineering or on the premises of the manufacturer of the control device 7, for example. In this case, the external computing device 13 and the further external computing device 16 can be provided in the form of a single computer or a plurality of interconnected computers, for example.

The inventive method is further explained below with reference to a specific example.

An operator of the machine 12 is no longer satisfied with the operating functionality that is offered by the MMI core software 5 and wishes to supplement this with simulation software for simulating production sequences of the machine, such that e.g. before execution of a part program which controls the movement of a tool, the movement process can be simulated and displayed to the operator on the screen 21. According to the invention, unlike the prior art in which new MMI software that is supplemented by simulation software is loaded onto the computing unit 2, provision is instead now made for loading e.g. the MMI application software 18a, which allows the desired simulation of production sequences of the machine, onto the further external computing device 16, wherein this runs under the control of the application server software 17 on the further external computing device 16. The MMI core software 5 and possibly the client software 3 are then adapted slightly, e.g. by means of modified parameters, such that they know that MMI application software 18*a* is available for simulating production sequences.

If the operator selects the simulation functionality, e.g. by invoking a corresponding menu in the operating unit 1 via the input means 20, the operating inputs of the operator (i.e. the input data that is generated by the operator) and an identification code, which contains the information that indicates the control device and hence the machine concerned and indicates the MMI application software for which the operating inputs are intended, are transferred to the communication server software 14. The latter uses the identification code as a means of determining the associated desired simulation software for the machine 12 and for the control device 7 in particular, i.e. the MMI application software 18*a* in this exemplary embodiment. The operating inputs are then transferred from the communication server software 14 to the MMI application software 18*a*.

Data that is required for the simulation, e.g. reference variables which are generated by the control software 6 for controlling the drives 11 and/or clamping means that are used for clamping the workpiece etc., is also transferred by the machine 12 and in particular by the control device 7 and in particular by the computing unit 2, from the machine 12 via the communication server software 14 to the MMI application software 18*a*. The MMI application software 18*a* then simulates the production sequence and transfers visualization data as a result, said visualization data specifying the graphical output image that is to be represented on the screen 21, via the communication server software 14 to the client software 3 of the control device 7, which determines the graphical output image from the visualization data. The graphical output image is then represented on the screen 21. The visualization data effectively takes the form of an image data stream which is displayed on the screen 21 by the client software 3.

It should be noted at this point that the further external computing device 16 for realization of the invention is not essential, and that the MMI application software 18*a*, 18*b* and 18*c* and the application server software 17 can instead also run on the external computing device 13 alongside the communication server software 14, as illustrated by a dashed line in FIG. 1.

In this case, if a plurality of machines from the field of automation engineering is present, the MMI application software that is assigned to the machines in each case can run on the external computing device 13 or the further external computing device 16. Since the identification code allows unambiguous identification of the control device 7, the relevant MMI application software can be assigned to its respectively associated control device 7. Like the machine 12, the machines in this case are connected via the data network 9 to the external computing device 12 and in particular to the communication server software 14. If a plurality of machines is present, the invention functions in a similar manner to that described above in relation to the machine 12. The further machines that are optionally present are indicated by a dashed line and denoted by the reference number 23 in FIG. 1. The machines 23 are connected to the data network 9 for the purpose of transferring data, this being illustrated by means of a dashed, double-headed arrow 24.

The very wide variety of data required by the MMI application software to realize its functionality can be transferred by the control device 7 and in particular by the control software 6, from the machine 12 via the communication server software 14 to the MMI application software. Therefore e.g. control variables of the machine or states of the machine (machine productive, machine non-productive) can be transferred to the MMI application software.

By virtue of the invention, the operating functionalities of the machine 12 can be extended as desired without thereby increasing the resource utilization of the machine hardware. Since the machine 12 retains MMI core software 5 running on the control device 7, the machine manufacturing can continue even if the connection to the MMI application software is disrupted, since the MMI core software 5 ensures a core operating functionality irrespective of the availability of the MMI application software.

The external computing device and/or the further external computing device can be e.g. part of a computer center in this case. This can be a computer center for a manufacturing or production facility. However, it can also be realized as a service in the form of ASP (Application Service Providing). This is particularly beneficial if the production infrastructure of the operational machines from the field of automation engineering is geographically or globally distributed.

The external computing device 13 or the external computing device 13 in conjunction with the further external computing device 16 represent a device for operating a machine from the field of automation engineering.

If at least part of the MMI application software is also to run in the machine 12 and in particular on the computing unit 2, either as a component of the MMI core software or in addition to the MMI core software, it is preferable for MMI application software which is to run on the external computing device 13 (or the further external computing device 16) and the MMI application software that is to run on the control device 2 to be distributed such that MMI application software which could cause a production failure if it were installed incorrectly runs on the external computing device 13 (or the further external computing device 16) and MMI application software which is likely to be non-critical in this respect runs on the control device 7.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A method for operating a machine from the field of automation engineering, comprising the steps of:
   determining whether an MMI (Machine-Machine-Interface) core software arranged in a control device of the machine needs to be supplemented based on a given operation;
   in an event that the MMI core software needs to be supplemented, transmitting operating inputs and an identification code entered at an operating unit and a computing unit of the control device for controlling drives of the machine via a data network to communication server software running on an external computing device, wherein the external computing device is not part of the machine and is located remote from the machine and said operating unit having a screen;

based on the identification code which includes an internationally unique allocated serial number of a control device of the machine and a code specifying an MMI (Machine-Machine-Interface) application software for which the operating inputs and data are intended and cannot be set up or manipulated by the operator, determining with the communication server software MMI application software associated with the machine and with the operating inputs;

adapting the MMI core software and a client software by modifying parameters, and thus, alerting that the MMI application software is now available for a desired operation;

with the communication server software, transmitting the operating inputs to the determined MMI application software running on the external computing device or on an additional external computing device;

determining with the MMI application software visualization data on the basis of the operating inputs, with the visualization data specifying a graphical output image to be represented on the screen and a manner in which the graphical output image is presented to an operator of the machine, such that operating functionalities of the machine can be extended as desired without increasing a demand for computing time and/or storage space required by the computing unit to perform the operating functionalities of the machine;

transmitting the visualization data to the machine via the communication server software and the data network; and representing the graphical output image on the screen based on the visualization data.

2. The method of claim 1, further comprising the step of transmitting the operating inputs and the identification code, by means of client software running on the machine, via the data network to the communication server software running on the external computing device or on an additional external computing device.

3. The method of claim 1, further comprising the step of
transmitting the visualization data by means of the communication software via the data network to the machine,
determining with client software running on the machine the graphical output image on the screen based on the visualization data, and
rendering the graphical output image on the screen.

4. The method of claim 1, wherein the MMI application software is used for at least one of:
simulating production sequences of the machine,
changing part programs,
diagnosing the machine, and
monitoring the machine.

5. The method of claim 1, wherein the machine is implemented as a machine tool, a production machine or a robot, or a combination thereof.

6. A system for operating a machine through controlling drives in the field of automation engineering, said system comprising:
an operating unit having a display screen;
an external computing device running communication server software, wherein the external computing device is not part of the machine and is located remote from the machine; and
a control device associated with the machine and configured to transmit operating inputs entered at the operating unit and an identification code via a data network to the communication server software running on the external computing device, said control device being connected to the controlling drives and allowing operations of the machine using an embedded MMI (Machine-Machine-Interface) core software and/or external software including a communication server software and an MMI application software, wherein the communication server software is configured to determine whether an MMI (Machine-Machine-Interface) arranged in a control device of the machine needs to be supplemented based on a given operation, wherein, in an event that the MMI core software needs to be supplemented, the communication server software is configured to transmit operating inputs and an identification code entered at an operating unit, and a computing unit of the control device for controlling drives of the machine via a data network to communication server software running on an external computing software, said operating unit having a screen;

determine, based on the identification code which includes an internationally unique allocated serial number of a control device of the machine and a code specifying an MMI (Machine-Machine-Interface) for which the operating inputs and data are intended and cannot be set up or manipulated by the operator, with the communication server software, software MMI application software associated with the machine and with the operating inputs;

adapt the MMI core software and a client software by modifying parameters;

transmit an alert that the MMI application software is now available for a desired operation;

transmit, with the communication server software, the operating inputs to the determined MMI application software running on the external computing device or on an additional external computing device;

determine, with the MMI application software, visualization data on the basis of the operating inputs;

specify, with the visualization data, a graphical output image to be represented on the screen and a manner in which the graphical output image is presented to an operator of the machine, such that the operating functionalities of the machine can be extended as desired without increasing a demand for computing time and/or storage space required by the computing unit to perform the operating functionalities of the machine;

transmit the visualization data to the machine via the communication server software and the data network; and represent the graphical output image on the screen based on the visualization data.

7. The system of claim 6, wherein the control device is connected to controlling drives of a machine from the field of automation engineering, and the control device further comprises:
an operating unit having a display screen, an input device and a computing unit, wherein the computing unit is configured to:
generate control variables for controlling drives of the machine;
transmit an identification and operating inputs entered at the operating unit, via a data network, to an external computing device or to an additional external computing device that is not part of the machine and is located remote from the machine;
receive from the external computing device or the additional external computing device, via the data network, visualization data determined by MMI application software based on the operating inputs, wherein the visualization data specifies a graphical output image to be represented on the display screen, and specifies a manner in which the graphical output image is presented to an operator of the machine;

determine, with MMI core software comprising rudimentary functions, the graphical output image based on the visualization data;

wherein the control device is configured to represent the graphical output image on the display screen based on the visualization data.

* * * * *